(12) United States Patent
Kelley

(10) Patent No.: US 6,724,406 B1
(45) Date of Patent: Apr. 20, 2004

(54) METHOD OF CONTROLLING WEB APPLICATIONS FROM REDIRECTING A CLIENT TO ANOTHER WEB ADDRESS

(75) Inventor: Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,041

(22) Filed: Nov. 10, 1999

(51) Int. Cl.[7] .................................................. G09G 5/00
(52) U.S. Cl. ........................ 345/804; 345/760; 345/820
(58) Field of Search .................................. 345/804, 805, 345/760, 781, 803, 744, 853, 854, 817–820, 824; 707/501, 513; 709/203, 210, 227–228

(56) References Cited

U.S. PATENT DOCUMENTS

| 5,751,956 A | 5/1998 | Kirsch |
| 5,812,769 A | 9/1998 | Graber et al. |
| 5,870,546 A | 2/1999 | Kirsch |
| 5,897,622 A * | 4/1999 | Blinn et al. .................... 705/26 |
| 6,317,786 B1 * | 11/2001 | Yamane et al. ............. 709/224 |
| 6,317,790 B1 * | 11/2001 | Bowker et al. ............. 709/225 |

\* cited by examiner

Primary Examiner—Sy D. Luu
(74) Attorney, Agent, or Firm—DeLio & Peterson, LLC; Kelly M. Reynolds; James J. Cioffi

(57) ABSTRACT

Disclosed is a method and apparatus which gives a user of a client computer greater control over a web browser by providing a web browser start indicator. The web browser start indicator controls the redirection capabilities of a web browser so that the user is not directed to another web site without the user's permission when closing a web browsing session or when returning to a previously viewed web site. Preferably, the present invention is embodied as a computer program product, for example a web browser and a web browser language such as JavaScript®, stored on a program storage device. Greater privacy and control is provided to users over current and subsequent browsing sessions.

26 Claims, 2 Drawing Sheets

METHOD OF CONTROLLING WEB APPLICATIONS FROM REDIRECTING A CLIENT TO ANOTHER WEB ADDRESS

BACKGROUND OF THE INVENTION

1. Field of the Invention

This invention is directed to a method and apparatus for controlling a web browser from redirecting a client computer to another web site during a browsing session. The present invention is most preferably a web browser comprising known program source code which provides a user additional controls when browsing a web site.

2. Description of Related Art

The Internet, particularly the World Wide Web, has become a mainstream form of entertainment for many users of client computers who have access through web browsers. Web browsers consist of software that runs on the client computer to display information from the Web on the client computer by interpreting the hypertext markup language (HTML) that is used to build homepages on the Web. Web browsing sessions may lead a user to a screen having multiple windows representing browsing sessions within a browsing session. There can be a chain of web sites that users are directed to automatically without asking for their permission with a click of a mouse. Each web site has a unique identifier known as a uniform resource locator (URL). The URL indicates where the host server is located, the location of the web site on the host, the name of the home page, and the file type of the document being requested by the client computer.

Current web browsers have the capability to redirect users to other web sites when the user selects a "close" function by attempting to terminate a browsing session by closing a window. This can be an annoying situation for the web browser user. Likewise, when a user engages the "back" function, the web browser may also be used to redirect the client to a another web site, usually a web site accessed previously. By controlling this redirection function of the web browser when the user engages the "close" function, a user gains greater control over their web browsing sessions. By preventing redirection when the user engages the "back" function, there is greater privacy when a single client computer is being shared by many users. Thus, it would be desirable to provide a web browser having greater redirection control than typical web browsers.

Bearing in mind the problems and deficiencies of the prior art, it is therefore an object of the present invention to provide a method and an apparatus for controlling the redirection capabilities of a web browser.

It is another object of the present invention to provide a computer program product which may be used in conjunction with an existing web browser which prevents redirection of the client computer when a "close" or "back" function is selected by a user.

A further object of the invention is to provide a web browser with enhanced user controls which prevents redirection of a client computer.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of controlling a web browser by which a user views a window, the method comprising the steps of: (a) determining whether the web browser may open a subsequent window after a first window is closed; (b) preventing the web browser from opening the subsequent window when a request to open the subsequent window is received when a selection is made in step (a) that the web browser may not open the subsequent window; and (c) allowing the web browser to open the subsequent window when a request to open the subsequent window is received when a selection is made in step (a) that the web browser may open the subsequent window.

Preferably, step (a) further includes providing a web browser start indicator wherein the indicator is engaged to prevent the web browser from opening a subsequent window. Alternatively, step (a) further includes providing a web browser start indicator wherein the indicator is disengaged to allow the web browser to open a subsequent window.

In another aspect, the present invention is directed to a method of controlling redirection of a client computer to another uniform resource locator by a web browser stored on the client computer, the method comprising the steps of: (a) providing a web browser start indicator; (b) selecting whether the web browser may open a subsequent window when a user activates or deactivates the web browser start indicator; (c) preventing the web browser from opening a subsequent window when the user activates the web browser start indicator; and (d) allowing the web browser to open a subsequent window when the user has deactivated the web browser start indicator.

Preferably, in step (a) the web browser start indicator determines whether the web browser will prevent or allow redirection of the client computer to a different uniform resource locator from a uniform resource locator being currently viewed by the client computer. Preferably, in step (c) the web browser is prevented from opening a subsequent window when the user selects a "back" function on the web browser to return to a previously accessed uniform resource locator. Furthermore, in step (c) the web browser is prevented from opening a subsequent window when the user selects a "close" function on the web browser. Preferably, in step (d) the web browser is allowed to open a subsequent window when the user selects a "back" function on the web browser and redirection is permitted to a previously viewed uniform resource locator. Furthermore, in step (d) the web browser is allowed to open a subsequent window when the user selects a "close" function on the web browser and redirection is permitted to another uniform resource locator.

In another aspect, the present invention is directed to a method of preventing redirection of a client computer engaging a web browser when a user is viewing a current web site during a browsing session, the method comprising the steps of: (a) providing a web browser start indicator for controlling redirection of the client computer to another web site; (b) activating the web browser start indicator; and (c) preventing the web browser from redirecting the client computer to the another web site when the user discontinues viewing the current web site.

Preferably, in step (c) the user discontinues viewing the current web site by closing the browsing session. Alternatively, in step (c) the user discontinues viewing the current web site by engaging a "back" function of the web browser to access a previously viewed web site.

In yet another aspect, the present invention is directed to a method of browsing a web site on a client computer comprising the steps of: (a) providing a web browser having a web browser start indicator, the web browser stored on the client computer; (b) engaging the web browser to access a web site by locating a desired uniform resource locator of the web site; (c) viewing one or more web sites such that more than one browser session is open; (d) activating the web browser start indicator; and (e) preventing the web browser from redirecting the client computer to another web site when an open browser session is terminated.

Preferably, step (e) comprises preventing the web browser from redirecting the client computer to another web site when a user terminates an open browser session by closing a window for viewing the browser session. Alternatively, step (e) may comprise preventing the web browser from redirecting the client computer to another web site when a user terminates an open browser session by engaging a "back" function of the web browser for viewing a previous web site during the browser session.

In yet another aspect, the present invention is directed to a web browser stored on a client computer for viewing web sites during a browsing session comprising a means for accessing one or more web sites during the browsing session; and a web browser start indicator to control redirection to another web site when terminating a currently viewed web site during the browsing session.

Preferably, the web browser start indicator is activated to prevent redirection to another web site when terminating a currently viewed web site during the browsing session. Alternatively, the web browser start indicator is deactivated to allow redirection to another web site when terminating a currently viewed web site during the browsing session.

In still yet another aspect, the present invention is directed to a program storage device readable by a machine, tangibly embodying a program of instructions executable by the machine to perform method steps for controlling a web browser by which a user views a window, the method steps comprising (a) determining whether the web browser may open a subsequent window after a first window is closed; (b) preventing the web browser from opening the subsequent window when a request to open the subsequent window is received when a selection is made in step (a) that the web browser may not open the subsequent window; and (c) allowing the web browser to open the subsequent window when a request to open the subsequent window is received when a selection is made in step (a) that the web browser may open the subsequent window.

In a further aspect, the present invention is directed to a program storage device readable by a machine, tangibly embodying a program of instructions executable by the machine to perform method steps for controlling the redirection of a client computer to another uniform resource locator, the method steps comprising (a) altering a web browser start indicator; (b) preventing a web browser from opening a subsequent window when the web browser start indicator is activated; and (c) allowing a web browser to open a subsequent window when the web browser start indicator is deactivated.

In a still further aspect, the present invention is directed to a program storage device readable by a machine, tangibly embodying a program of instructions executable by the machine to perform method steps for preventing redirection of a client computer engaging a web browser when displaying a current web site during a browsing session, the method steps comprising (a) determining a status of a web browser start indicator; (b) displaying a document at a uniform resource locator; (c) receiving an instruction to discontinue displaying the current web site; and (d) preventing redirection of the client computer to another web site when the web browser start indicator is activated.

In a still further aspect, the present invention to a program storage device readable by a machine, tangibly embodying a program of instructions executable by the machine to perform method steps for browsing a web site from a client computer, the method steps comprising (a) engaging a web browser having a web browser start indicator; (b) accessing a web site; (c) displaying one or more web sites such that more than one browser session is displayed; (d) altering the web browser start indicator; and (e) preventing redirection of the client computer to another web site when an open browser session is terminated.

In still yet a further aspect, the present invention is directed to a computer program product comprising a computer usable medium having computer readable program code means embodied in the medium for controlling a web browser by which a user views a window, the computer program product including a computer readable program code means for causing a computer to determine whether the web browser may open a subsequent window after a first window is closed; a computer readable program code means for causing the computer to prevent the web browser from opening the subsequent window when a request to open the subsequent window is received when a selection is made by a user that the web browser may not open the subsequent window; and a computer readable program code means for causing the computer to allow the web browser to open the subsequent window when a selection is made by a user that the web browser may open the subsequent window.

In a still further aspect, the present invention is directed to a computer program product comprising a computer usable medium having computer readable program code means embodied in the medium for controlling redirection of a client computer to another uniform resource locator by a web browser having a web browser start indicator, the computer program product including a computer readable program code means for causing a computer to alter the web browser start indicator; a computer readable program code means for causing the computer to prevent the web browser from opening a subsequent window when the web browser start indicator is activated; and a computer readable program code means for causing the computer to allow the web browser to open a subsequent window when the web browser start indicator is deactivated.

In still yet a further aspect, the present invention is directed to a computer program product comprising a computer usable medium having computer readable program code means embodied in the medium for causing a computer to prevent redirection of a client computer engaging a web browser when a client computer is displaying a current web site during a browsing session, the computer program product including: a computer readable program code means for causing a computer to determine a status of a web start indicator for controlling redirection of the client computer to another web site; a computer readable program code means for causing the computer to receive an instruction to discontinue displaying the current web site; and a computer readable program code means for causing the computer to prevent the web browser from redirecting the client computer to the another web site when the current web site is no longer displayed.

In a final aspect, the present invention is directed to a computer program product comprising a computer usable medium having computer readable program code means embodied in the medium for browsing a web site, the computer program product including a computer readable program code means for causing a computer to access a web site locating a desired uniform resource locator of the web site; a computer readable program code means for causing the computer to display one or more web sites such that more than one browser session is open; a computer readable program code means for causing the computer to alter a web browser start indicator; a computer readable program code means for causing the computer to determine the status of the web browser start indicator, and a computer readable program code means for causing the computer to prevent the web browser from redirecting the computer to another web site when an open browser session is terminated.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
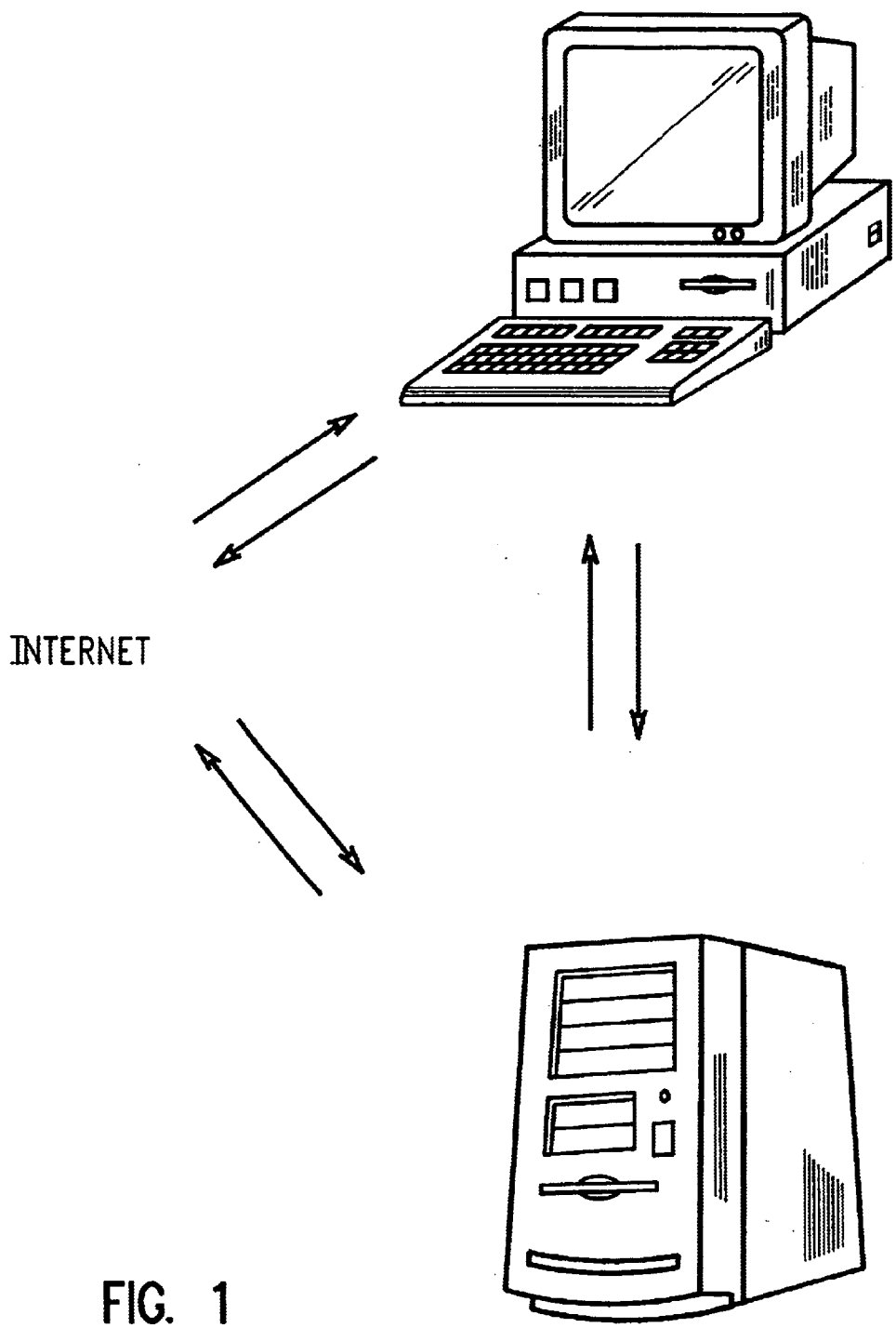
FIG. 1 is a schematic representation of a computer system for use with the present invention.

In describing the preferred embodiment of the present invention, reference will be made herein to FIGS. 1–2 of the drawings in which like numerals refer to like features of the invention. Features of the invention are not necessarily shown to scale in the drawings.

The present invention provides a method and apparatus which gives a user greater control over a web browser on a client computer. A web browser start indicator of the present invention controls the redirection capabilities of a web browser so that a user is not directed to another web site without the user's permission when closing a web browser session or when returning to a previously viewed web site. The present invention: may be embodied as a computer program product, for example a web browser and a web browser language such as JavaScript®, stored on a program storage device. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like. Preferably, a web browser comprising program source code may be used to perform the method steps of the present invention. Alternatively, another embodiment is a "plug-in" used in conjunction with an existing web browser stored on a client computer such as Netscape Navigator® from Netscape Communications Inc. or Internet Explorer® from Microsoft Corp. A "plug-in" is a file containing data used to alter, enhance, or extend the operation of a parent application program.

FIG. 1 is a schematic representation of a computer system which may be used to practice the present invention. Client computer 10 has a web browser stored thereon for accessing the Internet or World Wide Web, a major component of the Internet. Client computer 10 may be directly connected to the Internet through an Internet Service Provider (ISP) or connected to a server 20 as part of a local area network (LAN) which in turn has access to the Internet. When a user of client computer 10 engages the web browser a first browsing session is initialized. During browsing, however, subsequent multiple sessions may be initiated when the user selects a hyperlink within a web site which directs the web browser to open a new browsing session as another pop-up window. Each web site has a unique identifier known as a uniform resource locator (URL) which indicates the location of the web site on the host server, the name of the web page, and the file type of each document amongst other information.

The present invention provides a web browser start indicator which allows the user to control the redirection capabilities from the client computer when browsing the Internet. The web browser start indicator is written in known program source code which may work as a "plug-in" with a web browser already stored on the client computer or incorporated into a web browser embodying the process steps of the present invention. In accordance with the present invention, when the user closes a subsequent browsing session by closing the display window of the web browser, the client computer will not be redirected to another web site when the web browser start indicator is activated by the user. Similarly, when the user engages the "back" function to return to a previously viewed web site, the client computer will not be directed to another web site when the web browser start indicator is activated. This provides greater privacy to users and also allows greater control over current and subsequent browsing sessions.

Figure 2:
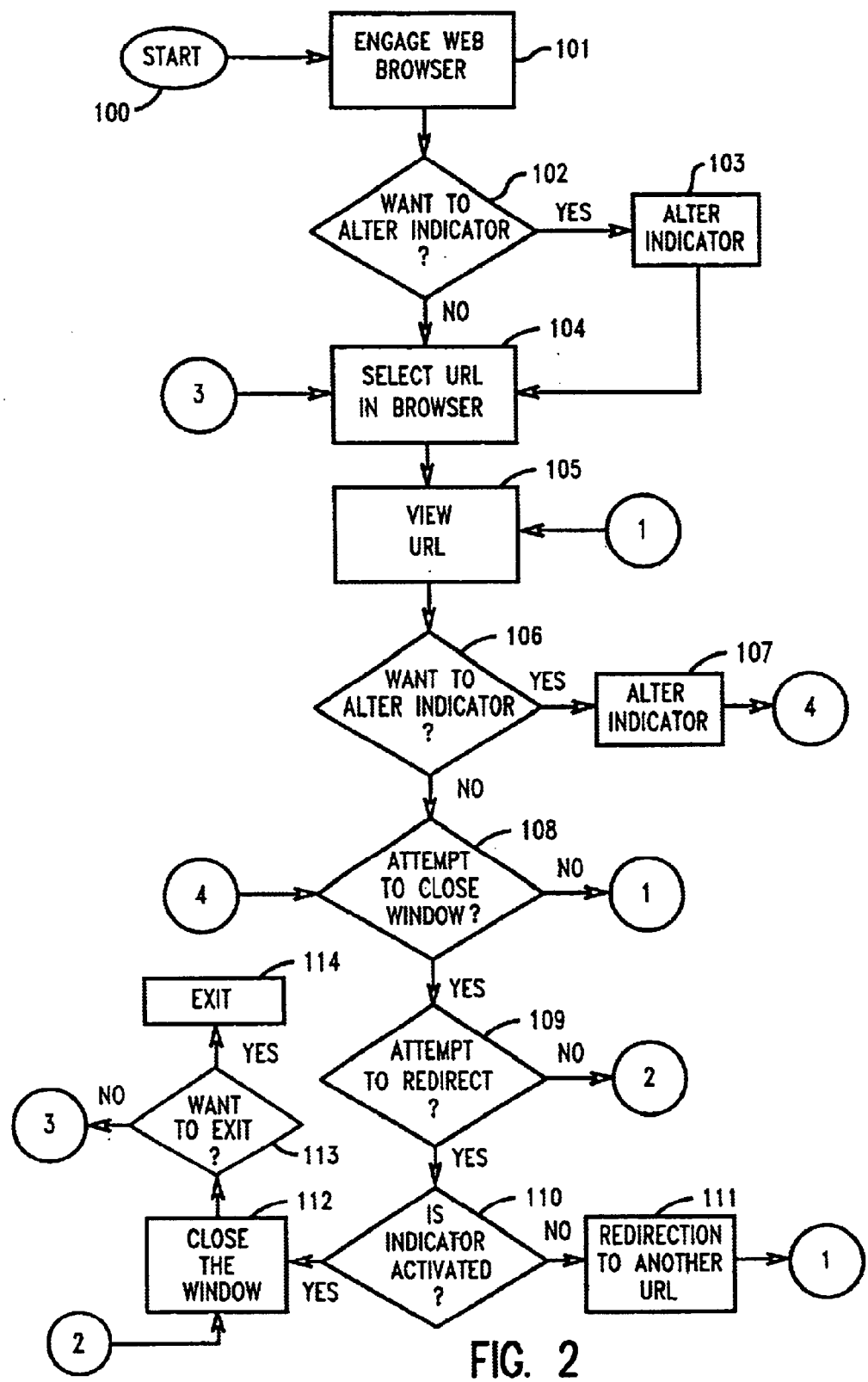
FIG. 2 is a flow diagram illustrating the method steps of the present invention.

FIG. 2 is a flow diagram illustrating the method steps of the present invention. The process begins 100 when a user engages the web browser 101 on their client computer. The user may decide whether to alter the status of the web browser start indicator 102 after engaging the web browser. If the user elects to alter the web browser start indicator 103, or not alter the indicator, the user may still continue to select a URL for viewing 104. From the URL, the web browser accesses the host server, requests the document, and the server either sends the document to the client computer or sends an error message if the document cannot be retrieved. The web browser then displays the document for viewing 105. Within the browsing session numerous secondary windows may be open representing a browsing session within the browsing session which will be referred to as secondary browsing sessions. The user may also choose to alter the web browser start indicator at this time 106, 107.

When the user activates a secondary browsing session, the user may attempt to end this secondary browsing session by closing the window which displays the document 108. If there is no attempt to close the window, the document is still open for viewing 105. However, if the user decides to close the window, the web browser will attempt to redirect the client to another web site 109. If there is a redirection attempt by the web browser, the present invention determines whether the web browser start indicator has been activated 110. If the indicator has not been activated, the web browser will redirect the client to another URL 111, and the user can view the document at the new URL. If the indicator has been activated, the web browser will not redirect the client to another URL and the window is closed 112. Likewise, if there is no attempt to redirect when the user chooses to close the currently viewed window, the window will close. Upon closing the window, the user determines whether to exit 113 the web browser program. If the user chooses not to exit, they continue to view the URL in the current window. The user may choose to exit 114 and terminate the web browsing session.

Alternatively, even when the user is merely browsing with only one window open, the web browser start indicator may be altered so that when the user engages a "back" function to return to a previous web site, redirection is prevented. This feature provides greater privacy to users wherein a single client computer must be shared by multiple users.

The present invention achieves the objects recited above. The web browser of the present invention contains a web browser start indicator which provides additional control to a user to prevent redirection of the client computer to another web site or web address when the user terminates a browsing session or returns to a previously viewed web site. Users controlling the redirection capabilities when browsing the Internet using a web browser of the present invention are no longer directed to a chain of web sites without their permission when terminating a browsing session. Multiple users who share a single client computer have greater privacy wherein previously viewed web sites may not be retrieved when a later user engages the "back" function of the web browser.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of controlling a web browser by which a user views a window, said method comprising the steps of:
   (a) providing a web browser on a client computer including a web browser start indicator;
   (b) determining whether the web browser may open a subsequent window after a first window is closed based on whether said web browser start indicator has been activated by the user at said client computer;
   (c) preventing the web browser from opening said subsequent window when a request to open said subsequent window is received when a selection is made by the user in step (b) that the web browser may not open said subsequent window; and
   (d) allowing the web browser to open said subsequent window when a request to open said subsequent window is received when a selection is made by the user in step (b) that the web browser may open said subsequent window.

2. A method of controlling redirection of a client computer to another uniform resource locator by a web browser stored on the client computer, said method comprising the steps of:
   (a) providing a web browser having a web browser start indicator, said web browser stored on the client computer;
   (b) a user selecting at the client computer whether said web browser may open a subsequent window upon termination of a currently viewed window when the user activates or deactivates the web browser start indicator;
   (c) preventing the web browser from opening said subsequent window when the user activates said web browser start indicator; and
   (d) allowing the web browser to open said subsequent window when the user has deactivated said web browser start indicator.

3. The method of claim 2 wherein in step (a) said web browser start indicator determines whether the web browser will prevent or allow redirection of the client computer to a different uniform resource locator from a uniform resource locator being currently viewed by the client computer.

4. The method of claim 2 wherein in step (c) the web browser is prevented from opening a subsequent window when the user selects a "back" function on the web browser to return to a previously accessed uniform resource locator.

5. The method of claim 2 wherein in step (c) the web browser is prevented from opening a subsequent window when the user selects a "close" function on the web browser.

6. The method of claim 2 wherein in step (d) the web browser is allowed to open a subsequent window when the user selects a "back" function on the web browser and redirection is permitted to a previously viewed uniform resource locator.

7. The method of claim 2 wherein in step (d) the web browser is allowed to open a subsequent window when the user selects a "close" function on the web browser and redirection is permitted to another uniform resource locator.

8. The method of claim 2 wherein said web browser start indicator is a plug-in within said web browser stored on the client computer.

9. The method of claim 2 wherein said web browser start indicator is incorporated into said web browser.

10. A method of preventing redirection of a client computer engaging a web browser when a user is viewing a current web site during a browsing session, said method comprising the steps of:
    (a) providing a web browser having a web browser start indicator for controlling redirection of the client computer to another web site, said web browser stored on the client computer;
    (b) a user activating said web browser start indicator; and
    (c) preventing the web browser from redirecting the client computer to the another web site when the user terminates viewing of the current web site by closing the browsing session.

11. The method of claim 10, wherein in step (c) the user terminates viewing of the current web site by closing the browsing session.

12. The method of claim 10 wherein in step (c) the user terminates viewing of the current web site by engaging a "back" function of the web browser to access a previously viewed web site.

13. A method of browsing a web site on a client computer comprising the steps of:
    (a) providing a web browser having a web browser start indicator, said web browser stored on the client computer;
    (b) engaging said web browser to access a web site by locating a desired uniform resource locator of said web site;
    (c) viewing one or more web sites such that more than one browser session is open;
    (d) a user activating the web browser start indicator; and
    (e) preventing said web browser from redirecting the client computer to another web site when an open browser session is terminated.

14. The method of claim 13 wherein step (e) comprises preventing said web browser from redirecting the client computer to another web site when a user terminates an open browser session by closing a window for viewing the browser session.

15. The method of claim 13 wherein step (e) comprises preventing said web browser from redirecting the client computer to another web site when a user terminates an open browser session by engaging a "back" function of said web browser for viewing a previous web site during the browser session.

16. A web browser stored on a client computer for viewing web sites during a browsing session comprising:

a means for accessing one or more web sites during the browsing session; and a web browser stored on a client computer having a web browser start indicator for activation by a user to allow the user control redirection to another web site when terminating a currently viewed web site by closing the browsing session.

17. The web browser of claim 16 wherein said web browser start indicator is activated to prevent redirection to another web site when terminating a currently viewed web site during the browsing session.

18. The web browser of claim 16 wherein said web browser start indicator is deactivated to allow redirection to another web site when terminating a currently viewed web site during the browsing session.

19. A program storage device readable by a machine, tangibly embodying a program of instructions executable by the machine to perform method steps for controlling a web browser by which a user views a window, said method steps comprising:

(a) determining whether a web browser including a web browser start indicator stored on a client computer may open a subsequent window after a first window is closed based on whether the web browser start indicator has been activated by the user;

(b) preventing the web browser from opening said subsequent window when a request to open said subsequent window is received when a selection is made by the user in step (a) that the web browser may not open said subsequent window; and (c) allowing the web browser to open said subsequent window when a request to open said subsequent window is received when a selection is made by the user in step (a) that the web browser may open said subsequent window.

20. A program storage device readable by a machine, tangibly embodying a program of instructions executable by the machine to perform method steps for controlling the redirection of a client computer to another uniform resource locator, said method steps comprising:

(a) a user altering a web browser start indicator of a web browser stored on a client computer;

(b) preventing the web browser from opening a subsequent window upon termination of a currently viewed window when said web browser start indicator is activated by the user; and (c) allowing said web browser to open said subsequent window when said web browser start indicator is deactivated by the user.

21. A program storage device readable by a machine, tangibly embodying a program of instructions executable by the machine to perform method steps for preventing redirection of a client computer engaging a web browser when displaying a current web site during a browsing session, said method steps comprising:

(a) determining whether a user has activated a web browser start indicator of a web browser stored on a client computer;

(b) displaying a document at a uniform resource locator;

(c) receiving an instruction to terminate displaying the current web site by closing the browsing session; and (d) preventing redirection of the client computer to another web site when said web browser start indicator is activated by the user.

22. A program storage device readable by a machine, tangibly embodying a program of instructions executable by the machine to perform method steps for browsing a web site from a client computer, said method steps comprising:

(a) engaging a web browser having a web browser start indicator, said web browser stored on the client computer;

(b) accessing a web site;

(c) displaying one or more web sites such that more than one browser session is displayed;

(d) a user altering the web browser start indicator at said client computer; and (e) preventing redirection of the client computer to another web site when an open browser session is terminated by the user.

23. A computer program product comprising a computer usable medium having computer readable program code means embodied in said medium for controlling a web browser by which a user views a window, said computer program product including:

a computer readable program code means for causing a computer to determine whether the web browser may open a subsequent window after a first window is closed based on whether a web browser start indicator of a web browser stored on a client computer has been activated by the user at said client computer;

a computer readable program code means for causing said computer to prevent the web browser from opening said subsequent window when a request to open said subsequent window is received when a selection is made by the user that the web browser may not open said subsequent window; and a computer readable program code means for causing said computer to allow the web browser to open said subsequent window when a selection is made by the user that the web browser may open said subsequent window.

24. A computer program product comprising a computer usable medium having computer readable program code means embodied in said medium for controlling redirection of a client computer to another uniform resource locator by a web browser having a web browser start indicator stored on said client computer, said computer program product including:

a computer readable program code means for causing said computer to allow a user to alter said web browser start indicator at said client computer;

a computer readable program code means for causing said computer to prevent said web browser from opening a subsequent window upon termination of a currently viewed window when said web browser start indicator is activated by the user; and a computer readable program code means for causing said computer to allow said web browser to open a subsequent window upon termination of a currently viewed window when said web browser start indicator is deactivated by the user.

25. A computer program product comprising a computer usable medium having computer readable program code means embodied in said medium for causing a computer to prevent redirection of a client computer engaging a web browser when a client computer is displaying a current web site during a browsing session, said computer program product including:

- a computer readable program code means for causing a computer to determine whether a user has activated at a client computer a web start indicator stored in a web browser on said client computer for controlling redirection of the client computer to another web site;
- a computer readable program code means for causing said computer to receive an instruction to terminate displaying of the current web site by closing the browsing session; and
- a computer readable program code means for causing said computer to prevent the web browser from redirecting the client computer to the another web site when the current web site is terminated.

26. A computer program product comprising:

a computer usable medium having computer readable program code means embodied in said medium for browsing a web site, said computer program product including:

- a computer readable program code means for causing a computer to access a web site locating a desired uniform resource locator of the web site;
- a computer readable program code means for causing said computer to display one or more web sites such that more than one browser session is open;
- a computer readable program code means for causing said computer to allow a user at a client computer to alter a web browser start indicator stored in a web browser on said client computer;
- a computer readable program code means for causing said computer to determine whether the user has activated the web browser start indicator at said client computer; and
- a computer readable program code means for causing said computer to prevent the web browser from redirecting said computer to another web site when an open browser session is terminated.

* * * * *